Dec. 19, 1950  I. ROBERTS  2,534,478
GAS PURIFYING METHOD AND APPARATUS
Filed March 31, 1947  3 Sheets-Sheet 1

Fig. 1

Inventor
Irving Roberts
By Brown, Critchlow, Flick & Peckham
his Attorneys

Fig. 2

Patented Dec. 19, 1950

2,534,478

UNITED STATES PATENT OFFICE 2,534,478

GAS PURIFYING METHOD AND APPARATUS

Irving Roberts, Greensburg, Pa., assignor to Elliott Company, Jeannette, Pa., a corporation of Pennsylvania Application March 31, 1947, Serial No. 738,487

17 Claims. (Cl. 62—175.5)

1

This invention relates to a method and apparatus for purifying a gaseous mixture by cooling the mixture to a very low temperature, and more particularly for purifying a gaseous mixture, such as air, before it is separated by rectification into its two main constituents in order to recover one of those constituents in either liquid or gaseous form.

In an air separation plant for producing oxygen, the incoming air may be purified by cooling it in a countercurrent heat exchanger. The air flows through the exchanger from the warm to the cold end in one set of passages; and a cold fluid, such as one of the products of rectification or air that has been previously purified, flows in the opposite direction in another set of passages. While the incoming air is being progressively cooled in this manner, the low volatile impurities contained in it, such as water vapor, carbon dioxide, and (if the air is at substantially atmospheric pressure and is cooled to approximately its liquefaction temperature) acetylene are condensed and deposited on the heat exchanging surfaces. As this deposition continues, the air passages through the exchanger eventually become so congested that the deposited impurities must be removed. This is usually done by deriming the exchanger. In order to avoid periodic shutdowns of the plant during the deriming operation, the flow of incoming air and cooling fluid may be switched through a second heat exchanger, in which the air is cooled and purified as before. At the same time a warm fluid, such as either air or the waste product of rectification, is passed through the air passages of the first exchanger to vaporize the impurities there deposited and is then discharged along with those impurities into the atmosphere.

While the alternating use of two heat exchangers in the manner just described makes it possible to produce oxygen continuously, only one of the heat exchangers is actually in operation at any given time. In each alternating cycle, the exchanger that is being derimed performs no cooling function. In addition, the use of a warm fluid to derime the plugged exchanger raises the temperature of the heat exchanging surfaces to the extent that is necessary to vaporize and carry off the deposited impurities. Additional work must then be performed in supplying refrigeration to recool those surfaces to their proper operating temperatures.

It is among the objects of my invention to provide a method and apparatus for cooling and

2 purifying a gaseous mixture by cooling the mixture to a very low temperature before rectifying it into its main constituents, whereby the cooling and purifying apparatus will at all times, even when it is being derimed, perform a useful cooling function; whereby the amount of refrigeration required to recool the apparatus after it has been derimed is considerably less than in other separation plants; and whereby the cooling, purifying and deriming operations will be accomplished efficiently and economically.

A further object of my invention is to reduce, as compared with other gas separation plants, the total area of heat exchanging surface in the plant and thereby decrease the initial cost of the plant.

In accordance with my invention, the heat exchangers used to purify a gaseous mixture perform a cooling function at all times, even when they are being derimed. In the practice of the invention, a pair of interchangeable countercurrent heat exchangers are used in alternation as follows: in one exchanger a gaseous mixture is cooled and purified in one passage or set of passages by indirect heat exchange with a cold fluid that contains no condensable impurities; in the second exchanger a warm compressed fluid that contains no condensable impurities is similarly cooled by means of a cooling fluid, which is at the same time warm enough to vaporize and carry off the impurities that were deposited in that exchanger during the previous cycle when it performed the function of a purifier. As applied to an oxygen plant, the gaseous mixture to be cooled and purified in the first exchanger (the one acting as the purifier in a given cycle) is air, and the cooling fluid in that exchanger may be either cold gaseous nitrogen or cold air that has been separated from the air or cold air that has been previously purified, depending on the type of separation system used. The cooling fluid in the second exchanger (the one that acted as the purifier in the previous cycle) is preferably cold waste nitrogen that has been separated from the air and that has been previously warmed elsewhere in the system to a temperature usually around −265° F., i. e. above the temperature of the air leaving the first exchanger but not materially above the temperature required to vaporize the various impurities in the plugged exchanger passages. The fluid that is cooled in the second exchanger may be either compressed nitrogen that has been separated from the air and that is recirculated in the system or compressed air that has been previously purified, depending on the type of separation system used. As applied to a liquid air plant in which the incoming air is to be purified and liquefied, but not separated, all of the gaseous fluids flowing in the two exchangers are air under varying conditions of temperature or pressure.

The apparatus and its arrangement for the practice of my invention are diagrammatically illustrated, with reference to the production of oxygen from air, in the accompanying drawings. Fig. 3 shows an apparatus for use in a gaseous oxygen plant having a double rectification column. It is to be understood that this invention is not limited to the cooling and purification of air and that it is equally applicable to the purification of other gaseous mixtures. either in connection with their separation into two main constituents by cooling and rectification or in connection with their liquefaction without separation.

Figure 1:
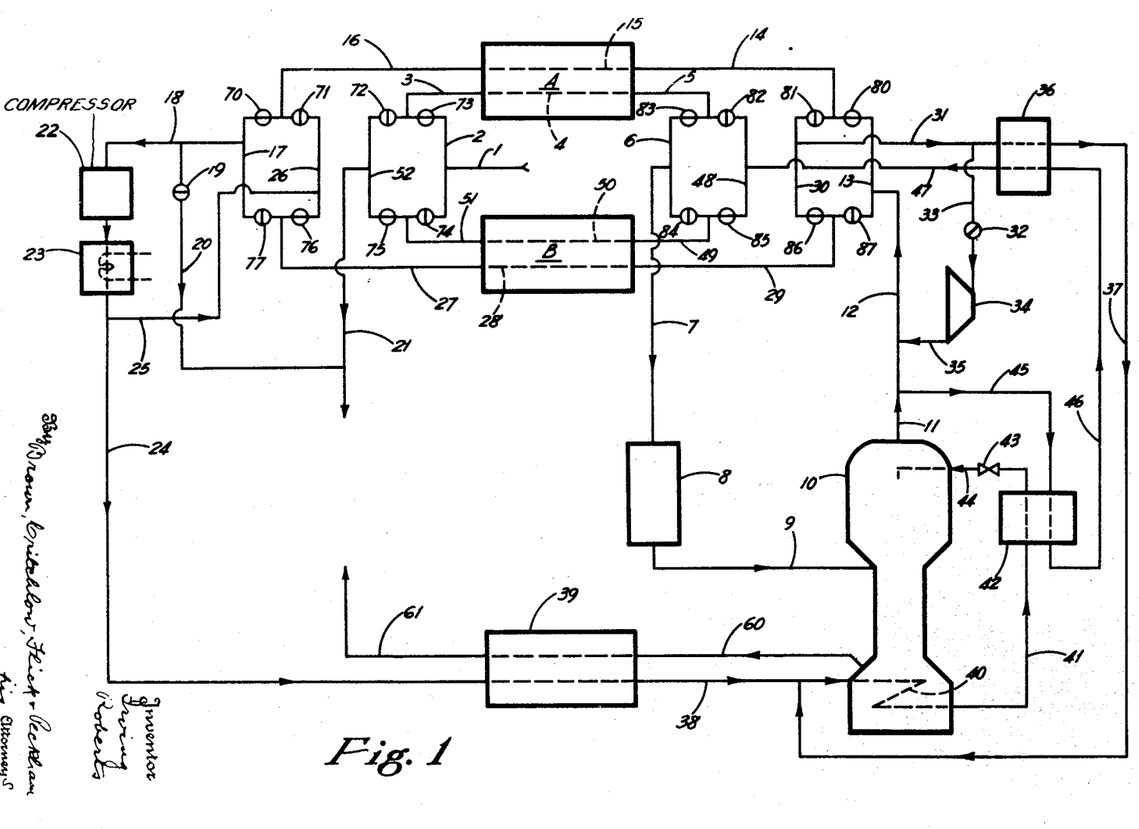
Fig. 1 shows an apparatus suitable for use in connection with a gaseous oxygen plant of large capacity having a single rectification column.
Figure 2:
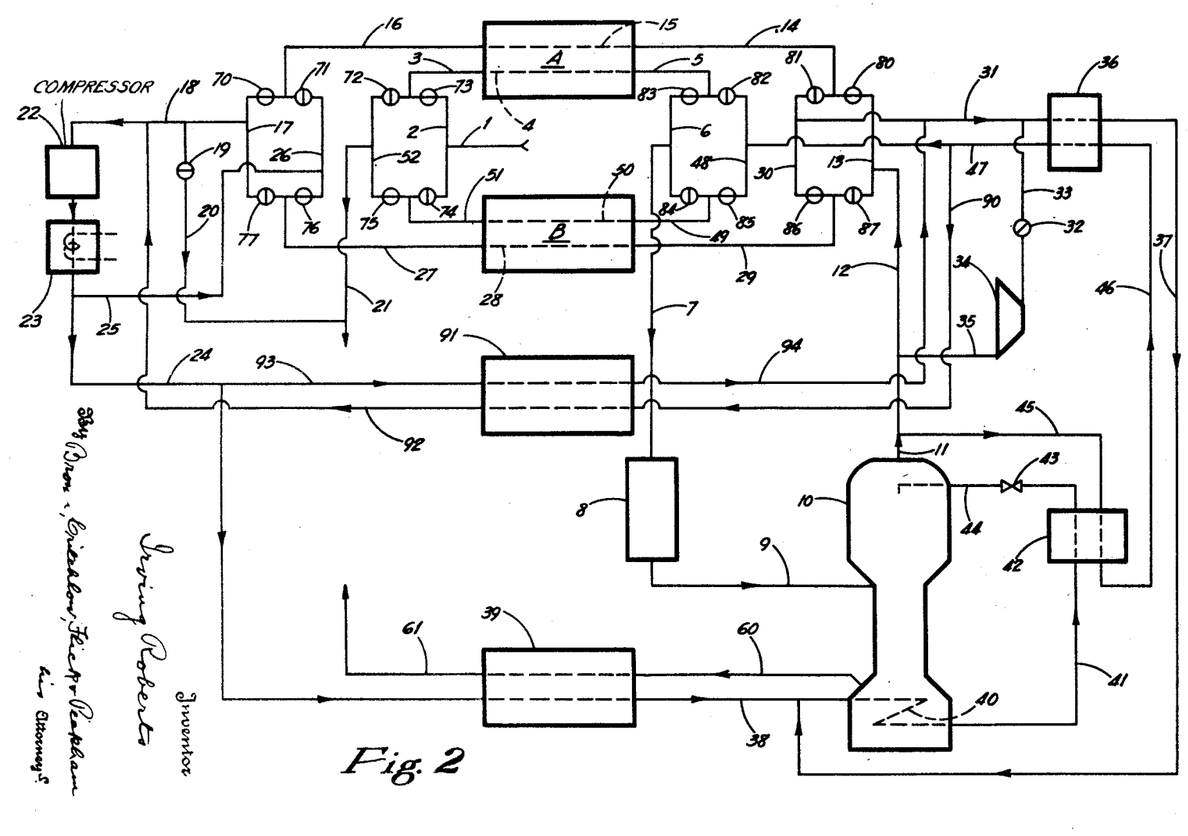
Fig. 2 shows a modification thereof for use in a gaseous oxygen plant of small capacity also having a single column.
Figure 3:
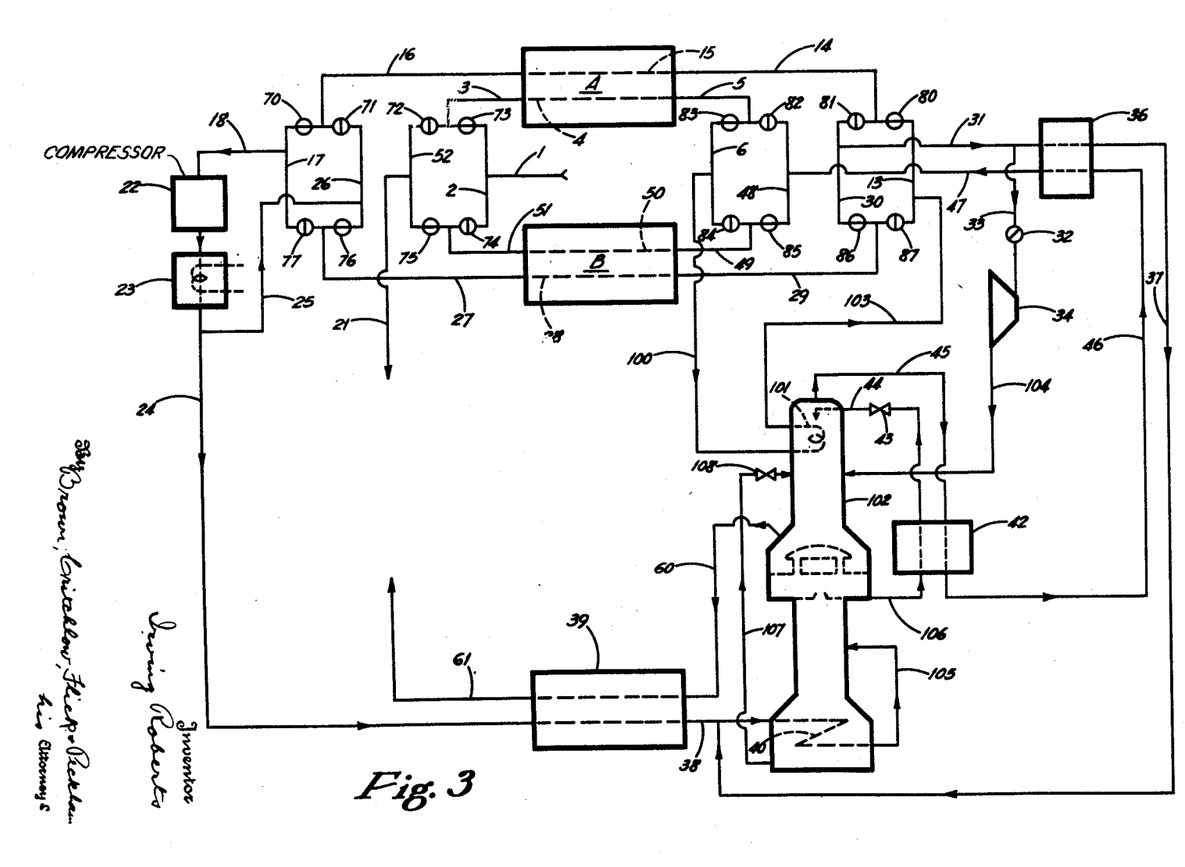

The two interchangeable heat exchangers A and B shown in the drawings may be of any conventional type provided with one or more passages for a gaseous fluid that is to be cooled and with one or more separate passages for a cooling fluid. To simplify this description, two separate passages only are indicated for each exchanger.

Fig. 1 shows the arrangement of those two exchangers in a low pressure air separation system of large capacity having a single rectification column. In this system, air at substantially atmospheric pressure is first cooled and purified and is then rectified to produce gaseous oxygen of high purity. The refrigeration required by the system as a whole and the liquid reflux required for rectification of the air are obtained by circulating some of the separated nitrogen in an auxiliary cycle. The operation of such a system is fully described in the copending application of Duffer B. Crawford for a Method and Apparatus for Separating Mixed Gases, Serial No. 730,081, filed February 21, 1947, now Patent No. 2,526,996, dated October 24, 1950.

Referring to Fig. 1, low pressure air is introduced into a pipe 1 by means of a blower (not shown). In order to decrease the amount of frost deposited in the heat exchanger that is acting as the purifier in a given cycle and to permit that exchanger to function for a longer period before it needs to be derimed, it is usually desirable to lower the dew point of the incoming air by removing some of its contained moisture. This may be done by any conventional means (not shown), such as a refrigerating unit and a silica gel dryer.

If it is assumed that heat exchanger A is the one in which the incoming air is being cooled and purified during a given cycle of operation of the plant, the air in pipe 1 flows through a branch pipe 2 and a pipe 3 to the warm end of a passage 4 in the exchanger. In flowing through that passage it is cooled by indirect heat exchange with cold nitrogen gas flowing in the opposite direction through a passage 15 in the same exchanger. Water is deposited as a frost in passage 4, beginning in a zone where the temperature of the heat exchanging surface corresponds to the dew point of the entering air. When the air reaches a zone having a temperature of about −110° F., frost ceases to be deposited in any substantial amount, since below that temperature the quantity of water vapor remaining in the air is extremely small. As the air flows further along the passage through progressively colder zones of the exchanger, carbon dioxide is deposited as a snow, beginning in a zone where the temperature of the heat exchanging surface is about −225° F. As the air is further cooled to approximately −310° F., a large percentage of the acetylene and any other hydrocarbons that may be present are deposited, thereby avoiding an explosive concentration of those impurities in the liquid oxygen at the bottom of a rectification column 10, in which the purified air is rectified.

The purified air, at a temperature of about −310° F., is led from the cold end of exchanger A by a pipe 5 to a branch pipe 6 and then by a pipe 7 to an accumulator 8, which is filled with silica gel or other suitable material and acts as a cold reservoir. Because of the heat capacity of such material, it acts as a reservoir of refrigeration and, because of its adsorbent capacity for air at very low temperatures, as a reservoir of air. These characteristics of the accumulator decrease the temperature and pressure fluctuations in the air stream caused by switching the incoming air from one heat exchanger to the other, when one has become plugged by the impurities condensed therein. An additional characteristic of the accumulator is that the silica-gel or other material therein removes by adsorption substantially all of the impurities that may not be condensed in the exchanger or that may be carried out of the exchanger during the brief period preceding the switching of the air stream from one exchanger to the other, as hereinafter explained. From the accumulator, the air is introduced by a pipe 9 into an intermediate level of the single rectification column 10, where it is rectified in the usual manner into relatively pure oxygen and nitrogen. The oxygen collects initially as a liquid at the bottom of the column; and the nitrogen leaves the top of the column as a gas through a pipe 11 at substantially atmospheric pressure and at a temperature of about −318° F.

Part of the cold nitrogen leaving the column through pipe 11 is led by a pipe 12, a branch pipe 13, and a pipe 14 to the cold end of passage 15 in exchanger A. In flowing through that passage the nitrogen cools the incoming air in passage 4 and is in turn warmed to only a few degrees below the temperature of the air entering passage 4. The nitrogen leaves the warm end of exchanger A by a pipe 16 and is then conducted by a branch pipe 17 to a pipe 18. Any desired proportion of the nitrogen in pipe 18, as controlled by a valve 19, is discharged into the atmosphere through pipes 20 and 21, and the balance is delivered to a compressor 22. The nitrogen entering compressor 22 is preferably there compressed to a pressure of from about 80 to 100 pounds per square inch absolute, and the heat of compression is removed in an aftercooler 23. The compressed nitrogen leaves the after-cooler by a pipe 24, from which part of the nitrogen is led by a pipe 25, a branch pipe 26, and a pipe 27 to the warm end of a passage 28 in exchanger B. In flowing through that passage it is cooled by means of cooling nitrogen flowing in the opposite direction through a passage 50 in the same exchanger.

The compressed nitrogen cooled in exchanger B leaves passage 28, at a temperature of about —255° F., by a pipe 29 and flows through a branch pipe 30 to a pipe 31, where it divides into two parts. One part, as controlled by the operation of a valve 32, is led by a pipe 33 to a loaded expander 34, which is preferably of the turbine type; and after it is there expanded with the performance of external work to substantially atmospheric pressure and its temperature lowered to approximately —318° F., it is led by a pipe 35 to pipe 12 where it augments the stream of cold nitrogen flowing from pipe 11 to exchanger A. The remaining part of the compressed nitrogen in pipe 31 that is not expanded enters a heat exchanger 36, in which it is further cooled by indirect heat exchange with cooling nitrogen from a pipe 46. The compressed nitrogen cooled in exchanger 36 is led by a pipe 37 to a pipe 38, where it joins the stream of compressed nitrogen from pipe 24 that has been cooled in an exchanger 39. Those combined streams of cold compressed nitrogen are led to a reboiler 40 at the bottom of the column, where they are further cooled and condensed to a liquid by giving up heat to the liquid oxygen surrounding the reboiler. The cold liquid nitrogen, still under pressure, then flows through a pipe 41 to a subcooler 42 and, after being expanded in a throttle valve 43 to substantially atmospheric pressure, is introduced by a pipe 44 into an upper level of the column as liquid reflux.

The remaining portion of the nitrogen leaving the column through pipe 11 is led by pipe 45 through the subcooler 42 to cool liquid nitrogen and is then led by a pipe 46 through exchanger 36 to cool compressed nitrogen, as previously described. As this cooling nitrogen passes through exchanger 36, it is warmed above the temperature of the cold air leaving exchanger A but not materially above the temperature that is required to vaporize the impurities deposited by the air in the latter exchanger. Because of this warming, the cooling nitrogen may be used, as hereinafter explained, to derime exchanger A when it becomes plugged with impurities. The cooling nitrogen leaves the warm end of exchanger 36 at a temperature of approximately —265° F. and is then led by a pipe 47, a branch pipe 48, and a pipe 49 to the cold end of passage 50 in exchanger B. In flowing through that passage it cools the compressed nitrogen flowing through passage 28 of the same exchanger and is in turn warmed to only a few degrees below the temperature of the compressed nitrogen entering passage 28. The nitrogen leaves the warm end of exchanger B by a pipe 51, and then by a branch pipe 52 and a pipe 21 it is discharged into the atmosphere.

The liquid oxygen at the bottom of the column is vaporized by the relatively warmer nitrogen flowing through the reboiler 40. Part of the vaporized oxygen acts as vapor reflux, and the remainder leaves the column by a pipe 60. The cold oxygen gas is led by pipe 60 to heat exchanger 39 to cool the compressed nitrogen delivered by pipe 24 to the same exchanger. The oxygen leaves the warm end of exchanger 39 by a pipe 61 and is discharged into any suitable container or is used directly in an industrial process.

After a period of time, usually about four hours, passage 4 of exchanger A will become so plugged by low volatile impurities deposited by the incoming air that the exchanger can no longer operate efficiently. It is then ready to be derimed. That operation is accomplished by switching the gas streams flowing through each exchanger, so that (a) cold nitrogen previously flowing through passage 15 of exchanger A will now flow in the same direction through passage 28 of exchanger B, (b) compressed nitrogen previously flowing through passage 28 of exchanger B will now flow in the same direction through passage 15 of exchanger A, (c) air previously flowing through passage 4 of exchanger A will now flow in the same direction through passage 50 of exchanger B, and (d) cooling nitrogen previously flowing through passage 50 of exchanger B will now flow in the same direction through passage 4 of exchanger A. After the switching, the incoming air from pipe 1 will be cooled in exchanger B by the cold nitrogen from pipe 12 as before, and compressed nitrogen from pipe 25 will be cooled in exchanger A by the cooling nitrogen from pipe 47 as before. At the same time, the cooling nitrogen that is flowing in passage 4 of exchanger A will vaporize and carry away the impurities previously deposited by the air in that passage.

In order to carry out the deriming operation most efficiently, it is important that, before the gas streams are switched, each passage of exchanger A have throughout its length a lower temperature than the corresponding passage of exchanger B with which it is connected by valved conduits. For example, under certain conditions satisfactory deriming may be carried out when the temperature of the heat exchanging surfaces in passage 4 (through which air is flowing) decreases from about 65° F. at its warm end to about —314° F. at its cold end, while the temperature of the heat exchanging surfaces in passage 50 (through which cooling nitrogen is flowing) decreases from about 115° F. to about —260° F.— a difference of about 50° F. in the temperatures of those surfaces at their warm ends. In general, the higher the dew point of the incoming air, the greater is the difference required in the warm end temperatures of those surfaces to obtain satisfactory deriming. Since those temperatures are mainly determined by the temperatures of the air and compressed nitrogen delivered to the warm ends of the exchangers, their difference may be controlled in accordance with the dew point of the air by increasing or decreasing the temperature of the compressed nitrogen delivered to exchanger B. To change the temperature of the compressed nitrogen so delivered, it is only necessary to vary the degree of after-cooling in after-cooler 23.

After the gas streams in each exchanger are switched with each other and normal operation is attained, the temperature conditions in passages 4 and 50 will be reversed. To hasten that reversal, the switching operation is preferably accomplished in two steps. First, the cold nitrogen (at about —318° F.) in pipe 12 is switched from passage 15 of exchanger A to passage 28 of exchanger B, and at the same time the warm compressed nitrogen (at about 120° F.) in pipe 25 is switched from passage 28 of exchanger B to passage 15 of exchanger A. The switching is done by closing valves 70, 76, 80, and 86 and by simultaneously opening valves 71, 77, 81, and 87, shown adjacent to the ends of those passages. There will then be two parallel streams of warm fluid (air and compressed nitrogen) flowing from the warm to the cold end of exchanger A. At the same time, there will be two parallel streams of cold fluid (cold nitrogen from pipe 12 and cooling nitrogen from pipe 47) flowing from the cold to the warm end of exchanger B.

The result of the initial switching will be to raise the temperatures in both passages of exchanger A and lower those in both passages of exchanger B. After about one minute of operation, the heat exchanging surfaces in exchanger B will be cooled, approximately uniformly, by about 50° F.; and at the same time the heat exchanging surfaces in exchanger A will be warmed, approximately uniformly, by about 50° F. At that time the temperature of the cold end of passage 4 in exchanger A will have been warmed to approximately −260° F., which closely corresponds to the temperature of the cooling nitrogen in pipe 47 that is to be switched through passage 4. The second step in the switching operation is now performed. The cooling nitrogen in pipe 47 is switched from passage 50 in exchanger B to passage 4 in exchanger A, and at the same time the incoming air in pipe 1 is switched from passage 4 in exchanger A to passage 50 in exchanger B. The switching is done by opening valves 72, 74, 82, and 84 and by simultaneously closing valves 73, 75, 83 and 85, shown adjacent to the ends of those passages. After the final switching operation has been completed, the temperatures along the length of each passage in exchanger A (now being derimed) and in exchanger B (now acting as the purifier) will more or less correspond with the normal operating temperatures in those passages. When exchanger B, in turn, becomes plugged by impurities deposited from the air in passage 50, the gaseous fluids are again switched from one exchanger to the other as previously described, except that the switching valves which were then closed will now be opened and those which were then opened will now be closed.

Exchangers 36 and 39 never become plugged by impurities, because all condensable impurities have previously been removed from the gaseous fluids passing through those exchangers and no other impurities are introduced.

The valves used to switch the gas streams between exchangers A and B may be of a relatively inexpensive type, such as butterfly valves. Ordinarily, such valves cannot be used in an air separation system because their tendency to leak may permit impurities to be introduced into other parts of the system, where they may contaminate the oxygen product and plug apparatus that cannot be derimed without shutting down the plant. With my apparatus, if impure air flowing through pipe 1 and branch pipe 2 should leak through a closed valve, the only effect would be that the leaking air would be discharged into the atmosphere along with the waste nitrogen product. For example, if it is assumed that exchanger A is acting as the purifier in a given cycle of operation, valve 72 adjacent to the warm end of that exchanger is normally in a closed position. Should any impure air, however, leak through that valve from branch pipe 2 into pipe 52, it will be discharged into the atmosphere through pipe 21, along with the waste nitrogen leaving passage 50 of exchanger B.

When the gas streams flowing through exchangers A and B are switched at the beginning of a clean-up cycle, certain valves, as hereinbefore described, are opened and closed simultaneously. In order to assure their simultaneous operation and thereby avoid any undesirable building up of pressure at various points within the system, the proper valves can be opened and others closed by means of a common control, such as, for example, by conventional interlocking connections between the valves.

It is a particular advantage of my invention that each of the heat exchangers A and B performs a useful cooling function at all times. In any given cycle of operation, one exchanger acts as a purifier, by cooling a gaseous mixture; and the other exchanger, while it is being derimed, cools a compressed fluid that is used elsewhere in the system. Moreover, when one exchanger is ready to be derimed, requiring a reversal of the temperature conditions in each exchanger, that reversal is accomplished by cooling one exchanger approximately to the same extent that the other exchanger is warmed. For this reason, only a small amount of refrigeration is required at the beginning of each cycle to recool the surfaces of the derimed exchanger to the temperatures normally prevailing in the purifying exchanger.

Fig. 2 shows a modified arrangement of a portion of the air separation system illustrated in Fig. 1. This modification is suitable for gaseous oxygen plants of small capacity. Since the heat leakage in small plants is proportionately greater than in large plants, the former require proportionately more refrigeration per pound of oxygen produced. To obtain this additional refrigeration, more nitrogen may be compressed and expanded in the auxiliary nitrogen cycle. It is not desirable, however, to compress and recirculate any of the waste nitrogen leaving the exchanger that is being derimed, because to do so would introduce impurities into the auxiliary cycle. Additional clean nitrogen may be obtained as shown in Fig. 2 by diverting through a pipe 90 some of the cooling nitrogen leaving the warm end of exchanger 36, warming the nitrogen so diverted in another heat exchanger 91, and then conducting it by a pipe 92 to pipe 18, where it augments the supply of warm nitrogen (from the exchanger that is acting as a purifier) flowing to the suction side of compressor 22. A portion of the compressed nitrogen in pipe 24, likewise, is diverted by a pipe 93 to exchanger 91, where in being cooled it warms the cooling nitrogen flowing in a reverse direction through the same exchanger. The compressed nitrogen cooled in exchanger 91 is then led by a pipe 94 to pipe 31, where it augments the supply of cold compressed nitrogen flowing both to the expander 34 and to the warm end of exchanger 36. In this way, proportionately the same amount of compressed nitrogen as in a large plant can be introduced into the warm end of exchanger 36 to maintain the same liquid reflux ratio in the column, and proportionately more compressed nitrogen than in a large plant can be expanded in expander 34 to obtain increased refrigeration for the system as a whole.

With slight modifications, a gaseous oxygen plant of the general type shown in Fig. 2 may be used to produce liquid oxygen. The essential modifications consist in eliminating exchanger 39 (since cold gaseous oxygen is no longer available as a cooling fluid), in passing all of the compressed nitrogen previously cooled in exchanger 39 through exchanger 91, and in drawing off liquid oxygen from the bottom of the column. Relatively more compressed nitrogen may then be passed through the expander to obtain the additional refrigeration required in producing liquid oxygen. None of these modifications, however, affect the method previously described of operating exchangers A and B.

Fig. 3 shows the arrangement of the two interchangeable exchangers A and B as part of an air separation system in which the air is rectified in a double column. This system differs from that represented in Fig. 1 in that, among other things, all of the refrigeration required to compensate for heat leakage and other thermodynamic losses of the system is obtained by compressing and subsequently expanding a portion of the air. Except for the column, the apparatus is similar to that shown in Fig. 1 and its operation may therefore be more briefly described.

Air, at substantially atmospheric pressure and preferably dried to some extent, is cooled and purified in passage 4 of exchanger A by indirect heat exchange with cold purified air flowing in the opposite direction through passage 15 of the same exchanger. The air purified in exchanger A and there cooled to a temperature of about −305° F. is led by a pipe 100 to a cooler 101 in the upper column of a double rectification column 102; here it is further cooled to about −312° F. by indirect heat exchange with the vapor and liquid refluxes of rectification. This cold purified air leaves the column by a pipe 103 and then flows through passage 15 in exchanger A to cool the incoming air in passage 4. After leaving the warm end of passage 15, the purified air flows through pipe 18 to compressor 22 and aftercooler 23.

Part of the compressed air leaving the aftercooler 23 enters the warm end of exchanger B, where it flows through passage 28 and is cooled by means of cooling nitrogen flowing in the opposite direction through passage 50 of the same exchanger. Some of the compressed air is then expanded to substantially atmospheric pressure with performance of external work in expander 34 and is introduced by a pipe 104 into an intermediate level of the upper column. The remaining part of the compressed air cooled in exchanger B that is not expanded flows through exchanger 36 to be further cooled by indirect heat exchange with cooling nitrogen from subcooler 42. The cold compressed air leaving exchanger 36 joins another portion of cold compressed air that has been cooled in exchanger 39, and the combined streams are passed through reboiler 40 at the bottom of the lower column and there liquefied by an oxygen-rich liquid surrounding the reboiler. This cold liquid air is then introduced by a pipe 105 into an intermediate level of the lower column, where it is fractionated into relatively pure nitrogen and an oxygen-rich liquid. The latter collects initially at the bottom of the column, then flows through a pipe 107 and is throttled to approximately atmospheric pressure by valve 108; it is then introduced into an intermediate level of the upper column to be rectified, along with the air introduced by pipe 104, into relatively pure oxygen and nitrogen. The oxygen collects initially as a liquid at the bottom of the upper column, and the nitrogen leaves the top by pipe 45.

The nitrogen resulting from the preliminary rectification of the air in the lower column collects as a liquid at the top of that column and is led by a pipe 106 through subcooler 42. It is then throttled to approximately atmospheric pressure by valve 43 and introduced as liquid reflux at an upper level of the upper column.

The nitrogen leaving the top of the upper column by pipe 45 flows through subcooler 42 to cool liquid nitrogen reflux; and it is then led through exchanger 36 and passage 50 of exchanger B, where in each case it cools compressed air flowing through those exchangers. As in Fig. 1, the warm waste nitrogen leaving exchanger B is discharged into the atmosphere.

The oxygen that collects as a liquid at the bottom of the upper column is vaporized by, and in turn condenses into a liquid, the gaseous nitrogen that is rectified in the lower column. The gaseous oxygen is led by pipe 60 from the upper column to exchanger 39, where it cools the compressed air flowing through that exchanger from pipe 24. The oxygen is then discharged by pipe 61 into any suitable container, or is used directly in an industrial process.

When exchanger A has become plugged by the impurities deposited from the incoming air in passage 4, the gas streams flowing through that exchanger are switched with those flowing through exchanger B in the same manner as previously described in connection with the apparatus shown in Fig. 1. After the switching is accomplished, the incoming air will be flowing through passage 50 of exchanger B and will be cooled by cold purified air flowing in the opposite direction through passage 28 of the same exchanger. Warm compressed air will be flowing through passage 15 of exchanger A and will be cooled by cooling nitrogen flowing in the opposite direction through passage 4 of the same exchanger. The nitrogen in the latter passage will at the same time vaporize and carry off the impurities previously deposited by the incoming air in that passage.

According to the provisions of the patent statutes, I have explained the principle, construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a gas processing plant, apparatus for continuously cooling and purifying a gaseous mixture and for continuously cooling a compressed gaseous fluid at least some of which is subsequently liquefied for use in the plant; comprising a pair of interchangeable countercurrent heat exchangers, each having passages therethrough provided with warm and cold ends; conduits for delivering the gaseous mixture to the warm end of a passage in one exchanger and for withdrawing it from the cold end; conduits for delivering a cold gaseous fluid to the cold end of a second passage in the same exchanger and for withdrawing it from the warm end, whereby the cold fluid will cool the mixture and cause the impurities therein to be deposited in the first passage; conduits for delivering a cooling gaseous fluid, which is warmer than the mixture leaving the first exchanger, to the cold end of a passage in the second exchanger and for withdrawing it from the warm end; conduits for delivering a compressed gaseous fluid to the warm end of a second passage in the second exchanger and for withdrawing it from the cold end, whereby the compressed fluid will be cooled by the cooling fluid; liquefying apparatus for receiving at least some of the cooled compressed fluid and liquefying it; valves for switching the cold fluid flowing to the first exchanger and the compressed fluid flowing to the second exchanger, to direct the cold fluid to the cold end of the second passage in the second exchanger and to direct the compressed fluid to the warm end of the second passage in the first exchanger; and valves for switching the mixture flowing to the first exchanger and the cooling fluid flowing to the second exchanger, to direct the mixture to the warm end of the first passage in the second exchanger and to direct the cooling fluid to the cold end of the first passage in the first exchanger, whereby the cooling fluid will cool the compressed fluid in the first exchanger and simultaneously remove the impurities previously deposited by the mixture in the same exchanger.

2. In a gas separation plant, apparatus for continuously cooling and purifying a gaseous mixture that is to be separated and for continuously cooling a compressed gaseous fluid at least some of which is subsequently liquefied for use in the separation plant: comprising a pair of interchangeable countercurrent heat exchangers, each having passages therethrough provided with warm and cold ends; conduits for delivering the gaseous mixture to the warm end of a passage in one exchanger and for withdrawing it from the cold end; conduits for delivering a cold gaseous fluid to the cold end of a second passage in the same exchanger and for withdrawing it from the warm end, whereby the cold fluid will cool the mixture and cause the impurities therein to be deposited in the first passage; conduits for delivering a cooling gas, which has been separated from the mixture and which is warmer than the mixture leaving the first exchanger, to the cold end of a passage in the second exchanger and for withdrawing it from the warm end; conduits for delivering a compressed gaseous fluid to the warm end of a second passage in the second exchanger and for withdrawing it from the cold end, whereby the compressed fluid will be cooled by the cooling gas; liquefying apparatus for receiving at least some of the cooled compressed fluid and liquefying it; valves for switching the cold fluid flowing to the first exchanger and the compressed fluid flowing to the second exchanger, to direct the cold fluid to the cold end of the second passage in the second exchanger and to direct the compressed fluid to the warm end of the second passage in the first exchanger; and valves for switching the mixture flowing to the first exchanger and the cooling gas flowing to the second exchanger, to direct the mixture to the warm end of the first passage in the second exchanger and to direct the cooling gas to the cold end of the first passage in the first exchanger, whereby the cooling gas will cool the compressed fluid in the first exchanger and simultaneously remove the impurities previously deposited by the mixture in the same exchanger.

3. In an air separation plant, apparatus for continuously cooling and purifying incoming air that is to be separated and for continuously cooling compressed nitrogen that has been separated from the air and that is recycled in the separation plant: comprising a pair of interchangeable countercurrent heat exchangers, each having passages therethrough provided with warm and cold ends; conduits for delivering the incoming air to the warm end of a passage in one exchanger and for withdrawing it from the cold end; conduits for delivering cold nitrogen to the cold end of a second passage in the same exchanger and for withdrawing it from the warm end, whereby the nitrogen will cool the air and cause the impurities therein to be deposited in the first passage; conduits for delivering cooling nitrogen, which is warmer than the air leaving the first exchanger, to the cold end of a passage in the second exchanger and for withdrawing it from the warm end; conduits for delivering compressed nitrogen to the warm end of a second passage in the second exchanger and for withdrawing it from the cold end, whereby the compressed nitrogen will be cooled by the cooling nitrogen; liquefying apparatus for receiving at least some of the cooled compressed nitrogen and liquefying it by heat exchange with a colder fluid to form liquid reflux for use in separating the air; valves for switching the cold nitrogen flowing to the first exchanger and the compressed nitrogen flowing to the second exchanger, to direct the cold nitrogen to the cold end of the second passage in the second exchanger and to direct the compressed nitrogen to the warm end of the second passage in the first exchanger; and valves for switching the air flowing to the first exchanger and the cooling nitrogen flowing to the second exchanger, to direct the air to the warm end of the first passage in the second exchanger and to direct the cooling nitrogen to the cold end of the first passage in the first exchanger, whereby the cooling nitrogen will cool the compressed nitrogen in the first exchanger and simultaneously remove the impurities previously deposited by the air in the same exchanger.

4. In an air separation plant, apparatus for continuously cooling and purifying incoming air that is to be separated and for continuously cooling compressed purified air that is also to be separated: comprising a pair of interchangeable countercurrent heat exchangers, each having passages therethrough provided with warm and cold ends; conduits for delivering the incoming air to the warm end of a passage in one exchanger and for withdrawing it from the cold end; conduits for delivering cold purified air to the cold end of a second passage in the same exchanger and for withdrawing it from the warm end, whereby the cold purified air will cool the incoming air and cause the impurities therein to be deposited in the first passage; conduits for delivering cooling nitrogen, which has been separated from the air and which is warmer than the incoming air leaving the first exchanger, to to cold end of a passage in the second exchanger and for withdrawing it from the warm end; conduits for delivering compressed purified air, which is warmer than the incoming air entering the first exchanger, to the warm end of a second passage in the second exchanger and for withdrawing it from the cold end, whereby the compressed air will be cooled by the cooling nitrogen; valves for switching the cold air flowing to the first exchanger and the compressed air flowing to the second exchanger, to direct the cold air to the cold end of the second passage in the second exchanger and to direct the compressed air to the warm end of the second passage in the first exchanger; and valves for switching the incoming air flowing to the first exchanger and the cooling nitrogen flowing to the second exchanger, to direct the incoming air to the warm end of the first passage in the second exchanger and to direct the cooling nitrogen to the cold end of the first passage in the first exchanger, whereby the cooling nitrogen will cool the compressed air in the first exchanger and simultaneously remove the impurities previously deposited by the incoming air in the same exchanger.

5. In a gas separation plant, apparatus for continuously cooling and purifying a gaseous mixture that is to be separated and for continuously cooling a compressed gaseous fluid that is used in the separation plant: comprising a pair of interchangeable countercurrent heat exchangers and a third countercurrent heat exchanger, each exchanger having passages therethrough provided with warm and cold ends; conduits for delivering the gaseous mixture to the warm end of a passage in one of the two interchangeable exchangers and for withdrawing it from the cold end; conduits for delivering a cold gaseous fluid to the cold end of a second passage in the same exchanger and for withdrawing it from the warm end, whereby the cold fluid will cool the mixture and cause the impurities therein to be deposited in the first passage; conduits for delivering a cooling gas, which has been separated from the mixture and which has been warmed in a passage in the third exchanger above the temperature of the mixture leaving the first exchanger, to the cold end of a passage in the second of the two interchangeable exchangers and for withdrawing it from the warm end; a compressor for receiving and compressing gaseous fluid leaving the warm end of the first exchanger; conduits for delivering part of the compressed gaseous fluid, which is warmer than the mixture entering the first exchanger, from the compressor to the warm end of a second passage in the second exchanger and for withdrawing it from the cold end, whereby the compressed fluid will be cooled in the second exchanger by the cooling gas; conduits for delivering part of the compressed fluid cooled in the second exchanger to the warm end of a second passage in the third exchanger to warm the cooling gas in the latter exchanger; valves for switching the cold fluid flowing to the first exchanger and the compressed fluid flowing to the second exchanger, to direct the cold fluid to the cold end of the second passage in the second exchanger and to direct the compressed fluid to the warm end of the second passage in the first exchanger; and valves for switching the mixture flowing to the first exchanger and the cooling gas flowing to the second exchanger, to direct the mixture to the warm end of the first passage in the second exchanger and to direct the cooling gas to the cold end of the first passage in the first exchanger, whereby the cooling gas will cool the compressed fluid in the first exchanger and simultaneously remove the impurities previously deposited by the mixture in the same exchanger.

6. In an air separation plant, apparatus for continuously cooling and purifying incoming air that is to be separated and for continuously cooling compressed nitrogen that has been separated from the air and that is recycled in the separation plant: comprising a pair of interchangeable countercurrent heat exchangers and a third countercurrent heat exchanger, each exchanger having passages therethrough provided with warm and cold ends; conduits for delivering the incoming air to the warm end of a passage in one of the two interchangeable exchangers and for withdrawing it from the cold end; conduits for delivering cold nitrogen that has been separated from the air to the cold end of a second passage in the same exchanger and for withdrawing it from the warm end, whereby the nitrogen will cool the air and cause the impurities therein to be deposited in the first passage; conduits for delivering cooling nitrogen, which has been separated from the air and which has been warmed in a passage of the third exchanger above the temperature of the air leaving the first exchanger, to the cold end of a passage in the second of the two interchangeable exchangers and for withdrawing it from the warm end; a compressor for receiving and compressing nitrogen leaving the first exchanger; conduits for delivering part of the compressed nitrogen, which is warmer than the air entering the first exchanger, from the compressor to the warm end of a second passage in the second exchanger and for withdrawing it from the cold end, whereby the compressed nitrogen will be cooled in the second exchanger by the cooling nitrogen; conduits for delivering part of the compressed nitrogen cooled in the second exchanger to the warm end of a second passage in the third exchanger to warm the cooling nitrogen in the latter exchanger; valves for switching the cold nitrogen flowing to the first exchanger and the compressed nitrogen flowing to the second exchanger, to direct the cold nitrogen to the cold end of the second passage in the second exchanger and to direct the compressed nitrogen to the warm end of the second passage in the first exchanger; and valves for switching the air flowing to the first exchanger and the cooling nitrogen flowing to the second exchanger, to direct the air to the warm end of the first passage in the second exchanger and to direct the cooling nitrogen to the cold end of the first passage in the first exchanger, whereby the cooling nitrogen will cool the compressed nitrogen in the first exchanger and simultaneously remove the impurities previously deposited by the air in the same exchanger.

7. In an air separation plant, apparatus for continuously cooling and purifying incoming air that is to be separated and for continuously cooling compressed purified air that is also to be separated: comprising a pair of interchangeable countercurrent heat exchangers and a third countercurrent heat exchanger, each exchanger having passages therethrough provided with warm and cold ends; conduits for delivering the incoming air to the warm end of a passage in one of the two interchangeable exchangers and for withdrawing it from the cold end; conduits for delivering cold purified air to the cold end of a second passage in the same exchanger and for withdrawing it from the warm end, whereby the cold purified air will cool the incoming air and cause the impurities therein to be deposited in the first passage; conduits for delivering cooling nitrogen, which has been separated from the air and which has been warmed in a passage in the third exchanger above the temperature of the incoming air leaving the first exchanger, to the cold end of a passage in the second of the two interchangeable exchangers and for withdrawing it from the warm end; a compressor for receiving and compressing purified air leaving the warm end of the first exchanger; conduits for delivering part of the compressed purified air, which is warmer than the incoming air entering the first exchanger, from the compressor to the warm end of a second passage in the second exchanger and for withdrawing it from the cold end, whereby the compressed air will be cooled in the second exchanger by the cooling nitrogen; conduits for delivering part of the compressed air cooled in the second exchanger to the warm end of a second passage in the third exchanger to warm the cooling nitrogen in the latter exchanger; valves for switching the cold air flowing to the first exchanger and the compressed air flowing to the second exchanger, to direct the cold air to the cold end of the second passage in the second exchanger and to direct the compressed air to the warm end of the second passage in the first exchanger; and valves for switching the incoming air flowing to the first exchanger and the cooling nitrogen flowing to the second exchanger, to direct the incoming air to the warm end of the first passage in the second exchanger and to direct the cooling nitrogen to the cold end of the first passage in the first exchanger, whereby the cooling nitrogen will cool the compressed air in the first exchanger and simultaneously remove the impurities previously deposited by the incoming air in the same exchanger.

8. In a gas separation plant, apparatus for continuously cooling and purifying a gaseous mixture that is to be separated and for continuously cooling a compressed gas that has been separated from the mixture and that is recycled in the separation plant: comprising a pair of interchangeable countercurrent heat exchangers (herein designated for convenience as exchangers A and B) and a pair of auxiliary countercurrent heat exchangers (herein designated for convenience as exchangers C and D), each exchanger having passages therethrough provided with warm and cold ends; conduits for delivering the gaseous mixture to the warm end of one passage in exchanger A and for withdrawing it from the cold end; conduits for delivering a cold gas that has been separated from the mixture to the cold end of a second passage in the same exchanger and for withdrawing it from the warm end, whereby the cold gas will cool the mixture and cause the impurities therein to be deposited in the first passage; conduits for delivering a portion of a cooling gas, which has been separated from the mixture and which has been warmed in one passage in exchanger C above the temperature of the mixture leaving exchanger A, to the cold end of one passage in exchanger B and for withdrawing it from the warm end; a compressor for receiving and compressing gas leaving the warm ends of exchangers A and D, conduits for delivering part of the compressed gas, which is warmer than the mixture entering exchanger A, from the compressor to the warm end of a second passage in exchanger B and for withdrawing it from the cold end, whereby the compressed gas will be cooled in exchanger B by the cooling gas; conduits for delivering part of the compressed gas cooled in exchanger B to the warm end of a second passage in exchanger C to warm the cooling gas in the same exchanger; conduits for delivering the remaining portion of the cooling gas warmed in exchanger C to the cold end of a passage in exchanger D and for conducting it from the warm end of that passage to the compressor; conduits for delivering another part of the compressed gas from the compressor to the warm end of a second passage in exchanger D and for withdrawing it from the cold end, whereby the compressed gas will be cooled in exchanger D by the cooling gas; conduits for delivering part of the compressed gas cooled in exchanger D to the warm end of the second passage in exchanger C to help warm the cooling gas in the same exchanger; valves for switching the cold gas flowing to exchanger A and the compressed gas flowing to exchanger B, to direct the cold gas to the cold end of the second passage in exchanger B and to direct the compressed gas to the warm end of the second passage in exchanger A; and valves for switching the mixture flowing to exchanger A and the cooling gas flowing to exchanger B, to direct the mixture to the warm end of the first passage in exchanger B and to direct the cooling gas to the cold end of the first passage in exchanger A, whereby the cooling gas will cool the compressed gas in exchanger A and simultaneously remove the impurities previously deposited by the mixture in the same exchanger.

9. In a gas processing plant, the method of continuously cooling and purifying a gaseous mixture and of continuously cooling a compressed gaseous fluid: comprising passing the mixture through one passage in a countercurrent heat exchanger; passing a cold gaseous fluid in the opposite direction through a second passage in the same exchanger to cool the mixture and cause the impurities therein to be deposited in the first passage; passing a compressed gaseous fluid through one passage in a second countercurrent heat exchanger; passing a cooling gaseous fluid, which is warmer than the mixture leaving the first exchanger, in the opposite direction through a second passage in the second exchanger to cool the compressed fluid; liquefying at least some of the cooled compressed fluid by heat exchange with a colder fluid; switching the cold gaseous fluid flowing to the first exchanger and the compressed fluid flowing to the second exchanger, so that each fluid will flow in a reverse direction through the passage in which the other fluid was previously flowing; and switching the gaseous mixture flowing to the first exchanger and the cooling fluid flowing to the second exchanger, so that the mixture will flow in a reverse direction through the passage in the second exchanger in which the cooling fluid was previously flowing and the cooling fluid will flow in a reverse direction through the passage in the first exchanger in which the mixture was previously flowing and will vaporize the impurities previously deposited by the mixture in that passage.

10. In a gas separation plant, the method of continuously cooling and purifying a gaseous mixture that is to be separated and of continuously cooling a compressed gaseous fluid that is used in the separation plant: comprising passing the mixture through one passage in a countercurrent heat exchanger; passing a cold gaseous fluid in the opposite direction through a second passage in the same exchanger to cool the mixture and cause the impurities therein to be deposited in the first passage; passing a compressed gaseous fluid through one passage in a second countercurrent heat exchanger; passing a cooling gas, which has been separated from the mixture and subsequently warmed above the temperature of the mixture leaving the first exchanger, in the opposite direction through a second passage in the second exchanger to cool the compressed fluid; liquefying at least some of the cooled compressed fluid by heat exchange with a colder fluid; switching the cold gaseous fluid flowing to the first exchanger and the compressed fluid flowing to the second exchanger, so that each of said fluids will flow in a reverse direction through the passage in which the other fluid was previously flowing; and switching the gaseous mixture flowing to the first exchanger and the cooling gas flowing to the second exchanger, so that the mixture will flow in a reverse direction through the passage in the second exchanger in which the cooling gas was previously flowing and the cooling gas will flow in a reverse direction through the passage in the first exchanger in which the mixture was previously flowing and will vaporize the impurities previously deposited by the mixture in that passage.

11. In an air separation plant, the method of continuously cooling and purifying incoming air that is to be separated and of continuously cooling compressed nitrogen that has been separated from the air and that is recycled in the separation plant: comprising passing the incoming air through one passage in a countercurrent heat exchanger; passing cold nitrogen in the opposite direction through a second passage in the same exchanger to cool the air and cause the impurities therein to be deposited in the first passage; passing compressed nitrogen through one passage in a second countercurrent heat exchanger; passing cooling nitrogen, which is warmer than the air leaving the first exchanger, in the opposite direction through a second passage in the second exchanger to cool the compressed nitrogen; liquefying at least some of the cooled compressed nitrogen by heat exchange with liquid oxygen; using nitrogen so liquefied as liquid reflux in separating the air; switching the cold nitrogen flowing to the first exchanger and the compressed nitrogen flowing to the second exchanger, so that each will flow in a reverse direction through the passage in which the other was previously flowing; and switching the air flowing to the first exchanger and the cooling nitrogen flowing to the second exchanger, so that the air will flow in a reverse direction through the passage in the second exchanger in which the cooling nitrogen was previously flowing and the cooling nitrogen will flow in a reverse direction through the passage in the first exchanger in which the air was previously flowing and will vaporize the impurities previously deposited by the air in that passage.

12. In an air separation plant, the method of continuously cooling and purifying incoming air that is to be separated and of continuously cooling compressed purified air that is also to be separated: comprising passing the incoming air through one passage in a countercurrent heat exchanger; passing cold purified air in the opposite direction through a second passage in the same exchanger to cool the incoming air and cause the impurities therein to be deposited in the first passage; passing compressed purified air, which is warmer than the incoming air entering the first exchanger, through one passage in a second countercurrent heat exchanger; passing cooling nitrogen, which has been separated from the air and subsequently warmed above the temperature of the incoming air leaving the first exchanger, in the opposite direction through a second passage in the second exchanger to cool the compressed air; switching the cold purified air flowing to the first exchanger and the compressed purified air flowing to the second exchanger, so that each will flow in a reverse direction through the passage in which the other was previously flowing; and switching the incoming air flowing to the first exchanger and the cooling nitrogen flowing to the second exchanger, so that the incoming air will flow in a reverse direction through the passage in the second exchanger in which the cooling nitrogen was previously flowing and the cooling nitrogen will flow in a reverse direction through the passage in the first exchanger in which the incoming air was previously flowing and will vaporize the impurities previously deposited by the air in that passage.

13. In a gas separation plant, the method of continuously cooling and purifying a gaseous mixture that is to be separated and of continuously cooling a compressed gaseous fluid that is used in the separation plant: comprising passing the mixture through one passage in a countercurrent heat exchanger; passing a cold gaseous fluid in the opposite direction through a second passage in the same exchanger to cool the mixture and cause the impurities therein to be deposited in the first passage; compressing gaseous fluid leaving the second passage of the first exchanger; passing a portion of the gaseous fluid so compressed through one passage in a second countercurrent heat exchanger and then part of the same portion through one passage in a third countercurrent heat exchanger; passing a cooling gas that has been separated from the mixture in the opposite direction through a second passage in the third heat exchanger to warm the cooling gas above the temperature of the mixture leaving the first exchanger; passing cooling gas so warmed in the opposite direction through a second passage in the second exchanger to cool the compressed fluid flowing through the same exchanger; switching the cold fluid flowing to the first exchanger and the compressed fluid flowing to the second exchanger, so that each fluid will flow in a reverse direction through the passage in which the other was previously flowing; and switching the mixture flowing to the first exchanger and the cooling gas flowing to the second exchanger, so that the mixture will flow in a reverse direction through the passage in the second exchanger in which the cooling gas was previously flowing and the cooling gas will flow in a reverse direction through the passage in the first exchanger in which the mixture was previously flowing and will vaporize the impurities previously deposited by the mixture in that passage.

14. In a gas separation plant, the method of continuously cooling and purifying a gaseous mixture that is to be separated and of continuously cooling a compressed gas that has been separated from the mixture and that is recycled in the separation plant: comprising passing the gaseous mixture through one passage in a countercurrent heat exchanger; passing a cold gas that has been separated from the mixture in the opposite direction through a second passage in the same exchanger to cool the mixture and cause the impurities therein to be deposited in the first passage; compressing gas leaving the second passage of the first exchanger; passing gas so compressed through one passage in a second countercurrent heat exchanger and then through one passage in a third countercurrent heat exchanger; passing a cooling gas that has been separated from the mixture in the opposite direction through a second passage in the third heat exchanger to warm the cooling gas above the temperature of the mixture leaving the first exchanger; passing part of the cooling gas warmed in the third exchanger in the opposite direction through a second passage in the second exchanger to cool the compressed gas flowing through the same exchanger; passing the remaining part of the cooling gas warmed in the third exchanger through one passage in a fourth countercurrent heat exchanger; compressing gas leaving the fourth exchanger; passing compressed gas in the opposite direction through a second passage in the fourth exchanger to be cooled by the cooling gas in the same exchanger;

passing compressed gas cooled in the fourth exchanger through the first passage in the third exchanger to help warm the cooling gas in the same exchanger; switching the cold gas flowing to the first exchanger and the compressed gas flowing to the second exchanger, so that each gas will flow in a reverse direction through the passage in which the other was previously flowing; and switching the mixture flowing to the first exchanger and the cooling gas flowing to the second exchanger, so that the mixture will flow in a reverse direction through the passage in the second exchanger in which the cooling gas was previously flowing and the cooling gas will flow in a reverse direction through the passage in the first exchanger in which the mixture was previously flowing and will vaporize the impurities previously deposited by the mixture in that passage.

15. A method according to claim 9, in which a short interval of time intervenes between (1) said switching the cold gaseous fluid and the stream of compressed fluid and (2) said switching the gaseous mixture and the stream of cooling fluid, said interval being sufficient to permit the gaseous mixture and the compressed fluid to flow concurrently through the first exchanger long enough to warm that exchanger approximately uniformly by an amount approximately equal to the difference in temperature between the gaseous mixture leaving the first exchanger and the compressed fluid leaving the second exchanger just before both of said switching operations are effected.

16. In a gas processing plant, apparatus for continuously cooling and purifying a gaseous mixture and for continuously cooling to a substantially constant temperature a compressed gaseous fluid: comprising a pair of interchangeable countercurrent heat exchangers, each having passages therethrough provided with warm and cold ends; conduits for delivering the gaseous mixture to the warm end of a passage in one exchanger and for withdrawing it from the cold end; conduits for delivering a cold gaseous fluid to the cold end of a second passage in the same exchanger and for withdrawing it from the warm end, whereby the cold fluid will cool the mixture and cause the impurities therein to be deposited in the first passage; conduits for delivering a stream of cooling gaseous fluid of substantially constant temperature, which is warmer than the cold mixture leaving the first exchanger but materially colder than the mixture entering that exchanger, to the cold end of a passage in the second exchanger and for withdrawing it from the warm end; conduits for delivering a different stream of gaseous fluid, which has been compressed, to the warm end of a second passage in the second exchanger and for withdrawing it from the cold end, whereby the stream of compressed fluid will be cooled to a substantially lower and constant temperature by the stream of cooling fluid; valves for switching the cold fluid flowing to the first exchanger and the stream of compressed fluid flowing to the second exchanger, to direct the cold fluid to the cold end of the second passage of the second exchanger and direct the compressed fluid to the warm end of the second passage of the first exchanger; and valves for switching the mixture flowing to the first exchanger and the stream of cooling fluid flowing to the second exchanger, to direct the mixture to the warm end of the first passage in the second exchanger and to direct the cooling fluid to the cold end of the first passage in the first exchanger, whereby the stream of cooling fluid will cool the stream of compressed fluid in the first exchanger and simultaneously remove the impurities previously deposited by the mixture in the same exchanger.

17. In a gas processing plant, the method of continuously cooling and purifying a gaseous mixture and of continuously cooling to a substantially constant temperature a compressed gaseous fluid: comprising passing the mixture through one passage of a countercurrent heat exchanger; passing a cold gaseous fluid in the opposite direction through a second passage in the same exchanger to cool the mixture and cause the impurities therein to be deposited in the first passage; passing a stream of compressed gaseous fluid through one passage in a second countercurrent heat exchanger; passing a different stream of cooling gaseous fluid, which has been warmed above the temperature of the mixture leaving the first exchanger, in the opposite direction through a second passage in the second exchanger to cool the stream of compressed fluid; switching the cold gaseous fluid flowing to the first exchanger and the stream of compressed fluid flowing to the second exchanger, so that each of said fluids will flow in a reverse direction through the passage in which the other fluid was previously flowing; and switching the gaseous mixture flow to the first exchanger and the stream of cooling fluid flowing to the second exchanger, so that the mixture will flow in a reverse direction through the passage in the second exchanger in which the cooling fluid was previously flowing and the cooling fluid will flow in a reverse direction through the passage in the first exchanger in which the mixture was previously flowing and will vaporize the impurities previously deposited by the mixture in that passage.

IRVING ROBERTS.

REFERENCES CITED

The following references are of record in the file of this patent:

UNITED STATES PATENTS

| Number | Name | Date |
| --- | --- | --- |
| 2,113,680 | De Baufre | Apr. 12, 1938 |
| 2,239,883 | De Baufre et al. | Apr. 29, 1941 |

OTHER REFERENCES

Blast Furnace and Steel Plant, H. Van Dyke, October 1948, pp. 1212–1215.